|| 3,363,246
IDENTIFICATION SYSTEM
Ronald E. Gareis and Charles E. Konrad, Roanoke, Va.,
    assignors to General Electric Company, a corporation
    of New York
Filed Apr. 19, 1967, Ser. No. 632,054
7 Claims. (Cl. 343—6.5)

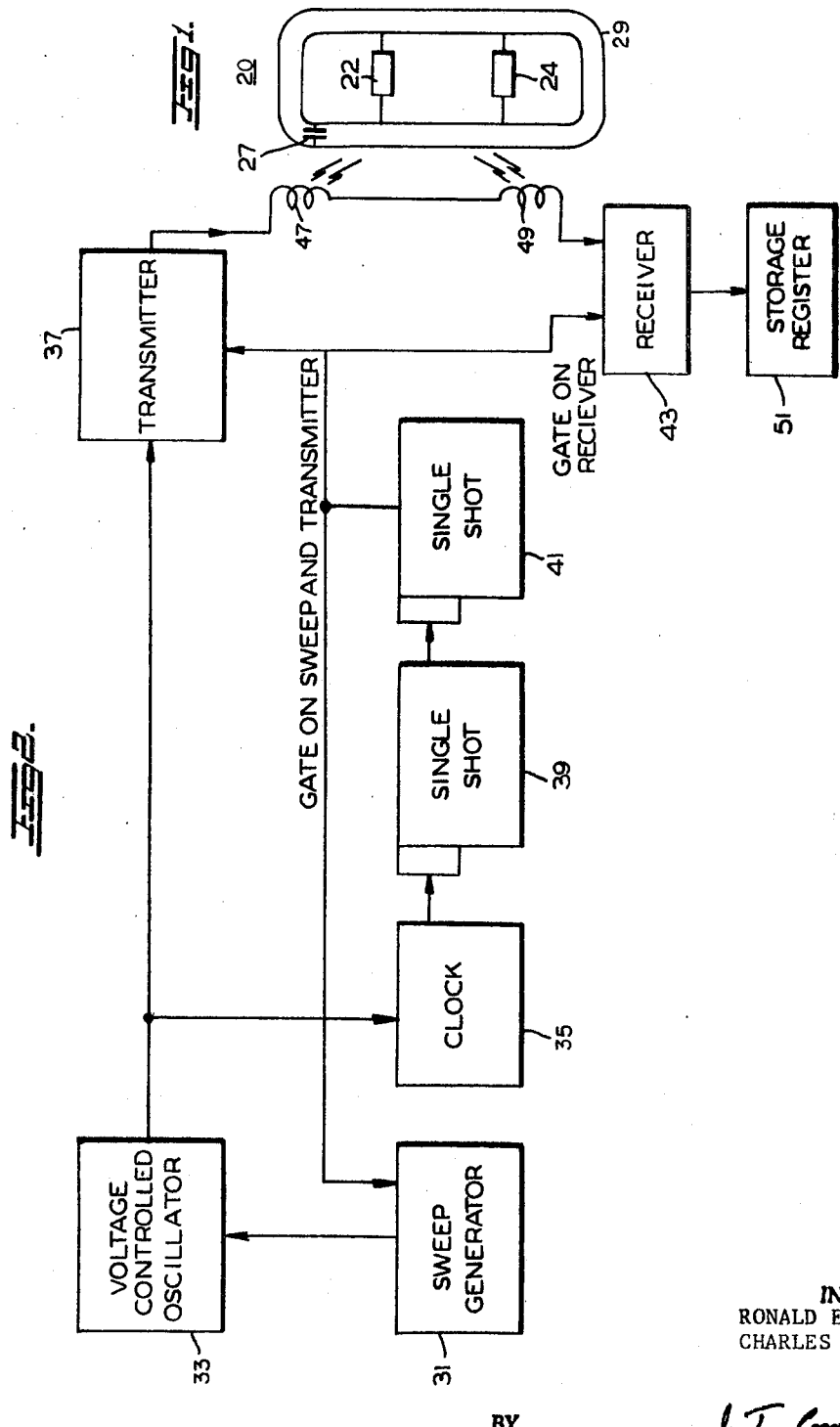

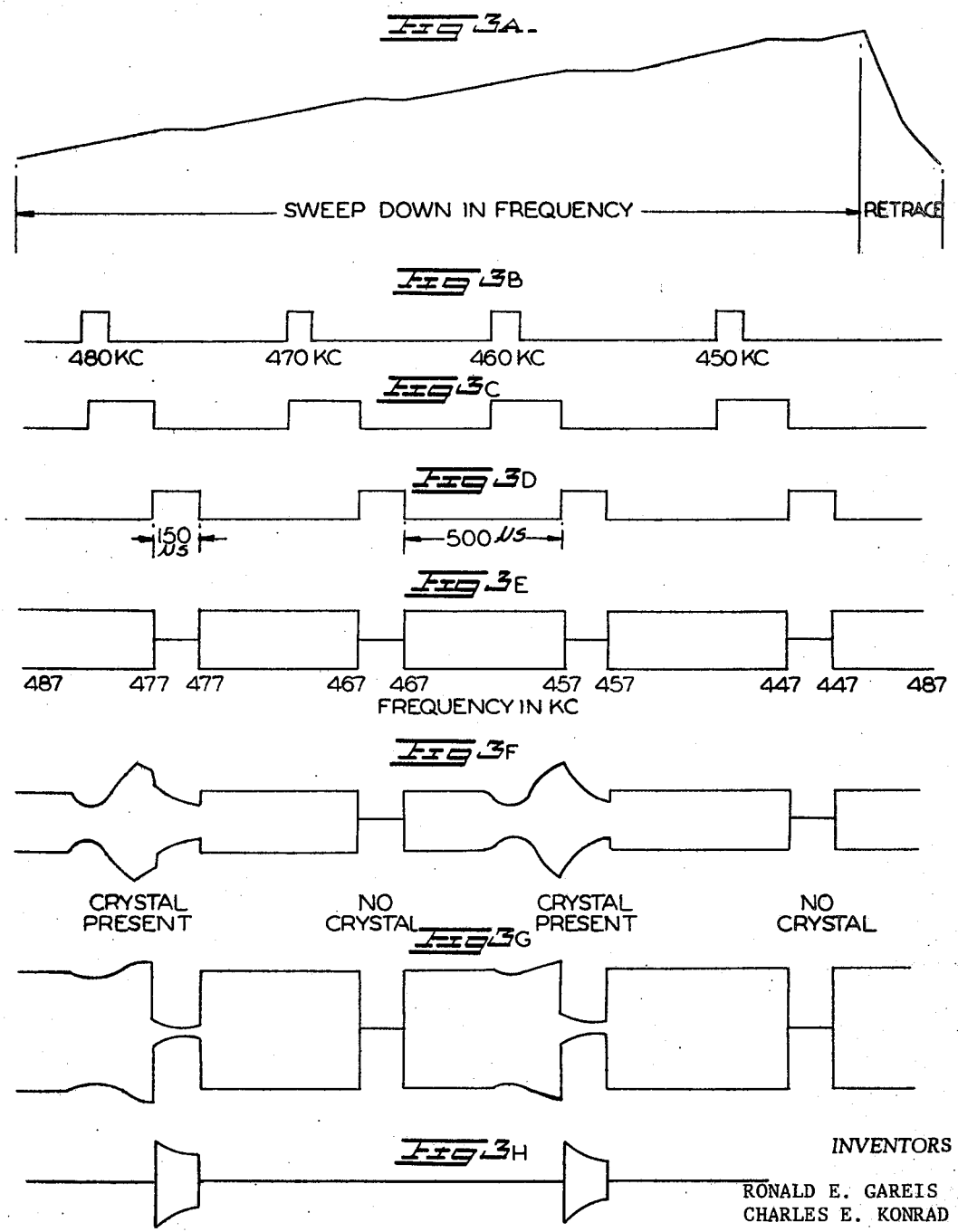

ABSTRACT OF THE DISCLOSURE

A system is described for identifying objects with each object having a unique identification device associated with each object. The unique identification device associated with each object uses piezoelectric elements, each having a different preselected frequency response. Identification of the object is made by the piezoelectric elements connected in the unique identification device. The piezoelectric elements in each identification device have different preselected frequency responses. Signals are transmitted over a preselected frequency from a transmitting antenna. Signals at the same frequencies of the piezoelectric elements connected in the identification devices are reflected in the identification device, and received by the receiving antenna. The receiver is turned off during the transmission time, and the transmitter is turned off after transmission. The receiver is then turned on to receive the transmitted signal.

---

This invention is directed to a system for identifying objects passing, or being passed by, an interrogating device.

This invention is specifically directed to a system for identifying objects, each object having a unique identification device with a provision for assuring that the proper identification is obtained from the identification device. In such identification systems the unique identification device associated with each object uses piezoelectric elements, each having a different preselected frequency response, whereby identification of the object is made by the piezoelectric element connected in the unique identification device. The piezoelectric elements in each identification device have different preselected frequency responses. Signals are transmitted over a preselected frequency from a transmitting antenna. Signals at the same frequencies of the piezoelectric elements connected in the identification device are reflected by the identification device, transmitted to a receiving antenna, and decoded to indicate the identity of the object as indicated by the identification device.

Identification systems constructed according to this construction have been very successful. Different aspects of such an identification system have been described in several patents. Patents 3,169,242, 3,209,350, 3,209,351, and 3,210,759 and application Ser. No. 596,376, filed Oct. 25, 1966, all describe such an identification system.

The only limitation on such identification system has been that the identification devices must be spaced relatively close to the transmitting and receiving antennas, in order to properly identify the identification device on the object to be identified. The spacing must be approximately one foot, and while this may be satisfactory in some applications, in other applications such as railroads, automobiles, and the like, such close spacing may cause problems. On railroad cars wheels wear, so that the separating distance may vary with the wheel wear. The trucks of railroad cars may vary in height, depending if they are loaded or unloaded, a distance of six to eight inches. A separating distance of twelve inches to start out with could therefore vary between six and eighteen inches. At the higher distance of eighteen inches, noise may be such that it would cause false identification. Thus the separating distance is critical, so that the applications of such systems is limited. Identification devices are also subject to damage from objects projecting from the trackway, or the highway.

This invention is specifically useful in that type of identification system wherein the unique identification device associated with each object uses piezoelectric elements, each having a different preselected frequency response, whereby identification of the object is made by the piezoelectric elements connected in the unique identification device.

In such an identification system, the piezoelectric elements in each identification device have different preselected frequency responses. Signals are transmitted over a preselected frequency range from a transmitting antenna. Signals at the same frequencies of the piezoelectric elements connected in the identification device are reflected by the identification device, transmitted to a receiving antenna, and decoded to indicate the identity of the object as indicated by the identification device.

The piezoelectric elements and assigned frequencies are usually about 10 kc. apart. Each different frequency represents a binary bit, with the presence of a piezoelectric element representing binary one, and the absence representing a binary zero. The number of different bits necessary in an object identification system depends on the number of objects to be identified. The more objects to be identified the more binary bits that are needed.

It is therefore an object of this invention to provide a new and improved object identification system.

Another object of this invention is to provide a new and improved object identification system which is more accurate than previous identification systems.

Another object of this invention is to provide a new and improved object identification system which allows a large separating distance between the antenna and the identification device on the object to be identified.

According to this invention, therefore, the transmitting sweep frequency is only transmitted during the time that there can be a frequency response from a piezoelectric element in the identification device. The transmitted sweep signal is then turned off after it passes through each specific frequency at which there is a piezoelectric element having a preselected frequency response. Each piezoelectric element continues to oscillate after the exciting transmitted sweep signal is turned off and decays during a period of 200 microseconds.

Signals at the same frequencies of the piezoelectric elements connected in the identification device are reflected during the decay period, transmitted to a receiving antenna, and decoded to indicate the identity of the object as indicated by the identification device.

By turning the transmitter on before the master sweep frequency reaches the frequency of a potential piezoelectric element an exciting signal is transmitted to excite the potential piezoelectric element. The transmitter is then off, the receiver is turned on, and if the identification device has a piezoelectric element at this frequency, the piezoelectric element will continue to oscillate during a decay period. The oscillations from the selected piezoelectric element are then transmitted, and a sensitive receiver receives the selected frequency signal.

In the drawings,

FIG. 1 is a schematic drawing of a signal repeating device.

FIG. 2 is a schematic of an identification system constructed according to this invention.

FIG. 3A shows the output from the sweep oscillator 31.
FIG. 3B shows the output from the clock 35.
FIG. 3C shows the output from the single shot 39.
FIG. 3D shows the output from single shot 41.

FIG. 3E shows the transmitter output.

FIG. 3F shows the response from the signal repeating device.

FIG. 3G shows the signal received by the receiver antenna.

FIG. 3H shows the signals received by the receiver and stored in storage register 51.

Referring now to FIG. 1, a signal repeating device 20 is attached to each object such as an automobile, or a railroad car, which is to be identified. Each signal repeating device 20 may have up to four piezoelectric elements parallel through capacitor 27 to pick up antenna 29. The piezoelectric elements are selected from four different frequencies from 450 kc. through 480 kc. as indicated in the time chart shown in FIG. 3F. The specific device 20 shown only has two piezoelectric devices 22 and 24.

The piezoelectric elements may be small discs of lead zirconate-titanate, or barium titanate. They may also be constructed of other materials which have a piezoelectric effect. Piezoelectric elements of lead zirconate-titanate have a resonant frequency tolerance within 0.1% from −40° C. to 85° C. The resonant frequency is estimated to change no more than ±0.2% in 10 years. The piezoelectric elements of lead zirconate-titanate have a minimum impedance of approximately 15 ohms at resonance. At a non-resonance frequency, their impedance is of the order of 1000 ohms.

Each signal repeating device 20 therefore has a low impedance at the frequencies of the piezoelectric devices connected into the pickup antenna 27, and a high impedance at the other frequencies. Each signal repeating device 20 may be coded in binary form to represent an identification number identifying the object to which the signal repeating device 20 is connected.

Referring now to FIG. 2 a sweep generator and voltage controlled oscillator, 31 and 33 are adapted to generate a signal starting from approximately 450 kc. to approximately 480 kc. The signal from the sweep oscillator 31 is applied to a voltage controlled oscillator 33 which produces a radio frequency signal. The signal from the voltage controlled oscillator 33 is applied to a clock circuit 35. The clock 35 contains four piezoelectric elements, with a piezoelectric element at 450 kc., at 460 kc., at 470 kc. and at 480 kc. Thus when the clock 35 is driven by the voltage controlled oscillator 33, it produces a signal at a predetermined time in synchronism with the production of a corresponding frequency by the voltage controlled oscillator 33. The clock circuit 35 thus produces a signal at 480 kc., 470 kc., 460 kc. and 450 kc. as shown in FIG. 3B.

The signal from the voltage controlled oscillator 33 is also applied directly to transmitter 37 so that transmitter 37 can transmit the signal from the voltage controlled oscillator 32 when the transmitter 37 is turned on.

The signal from the clock as shown in FIG. 3B is applied to a single shot 39 that produces a resulting pulse as shown in FIG. 3C which is applied to single shot 41 so that single shot 41 produces a 150 microsecond pulse starting at the end of the pulse from single shot 39. The output pulse from single shot 41 will last for 150 microseconds and then the signal will reverse until the output signal is again reversed at the end of 500 microseconds by the negative going side of the pulse from single shot 39. The output from the single shot 41 is shown in FIG. 3D. The output pulse from single shot 41 is applied to the transmitter 37 so that the transmitter is turned off for 150 microseconds by the positive going edge of the signal, and then turned on again at the end of the 150 microsecond interval by the negative side of the signal.

The output from single shot 41 is also applied to the receiver 43 as shown in FIG. 2. At the same time that positive going side of the signal from one shot 41 turns transmitter 37 off, the receiver 43 is turned on.

The signal from single shot 41 is also applied to the sweep oscillator 31 to inhibit the sweep oscillator during the time that the transmitter 37 is turned off.

FIG. 3F shows the response at one specific frequency from a signal repeating device when a piezoelectric element is present at that specific frequency. Note that after the transmitter is turned off as indicated in FIG. 3F, that the response from the selected piezoelectric element in the signal repeating device continues to ring after the transmitter has been turned off. The response from the selected piezoelectric elements is an exponentially damped sinusoidal signal which decays during the 150 microsecond time that the transmitter is turned off. The receiver 43 is turned on during this period of time as shown in FIG. 3H so that if there is a piezoelectric element at that particular frequency response the receiver 43 will receive the output from that particular piezoelectric element.

Referring now to FIG. 1 for a description of the operation of the invention, a signal repeating device 20, attached to an object to be identified, has two piezoelectric elements 22 and 24 connected in parallel through capacitor 27 to the pickup antenna 29, with piezoelectric element 22 having a frequency response of 440 kc. and piezoelectric element 24 having a frequency response of 470 kc. To identify the object according to the coded piezoelectric elements the signal repeating device 20 is positioned over the transmitting antenna 47 and receiving antenna 49, respectively.

Assume for the immediate purposes of this description that single shot 41 has turned on transmitter 37 and the sweep oscillator 31 so that sweep oscillator 31 applys a varying signal to the voltage controlled oscillator 33 so that the voltage controlled oscillator 33 produces a signal starting at 487 kc. The signal is applied to the transmitter 37 and as transmitter 37 is turned on at this time, transmitter 37 transmits the 480 kc. signal from transmitting antenna 47 as shown in FIG. 3E.

The receiver 43 is turned off at this time by the zero going signal shown in FIG. 3D from single shot 41. There is a piezoelectric element at the 480 kc. frequency so that a signal is reflected from the signal repeating device at 480 kc. The transmitter 37 is turned off after 500 microseconds by single shot 41 and the sweep oscillator 31 is inhibited.

The receiver 43 is then turned on at the same time that the transmitter 37 and sweep oscillator 31 are turned off so that the receiver can receive a signal reflected from a piezoelectric element in the signal repeating device 21 at the 480 kc. frequency. There is a piezoelectric element at the 480 kc. frequency in the signal repeating device, so that a signal is received by the receiver 43, and stored in storage register 51.

There is no piezoelectric element at 470 kc. so no signal is stored in the register 51.

The transmitter 37 and the sweep oscillator 31 are then turned on at 460 kc. frequency so that transmitter 37 transmits a 467 to 457 kc. signal from transmitter 47. There is a piezoelectric element in the signal repeating device 21 which is resonant at 450 kc. so that an exponentially damped sinusoidal signal as shown in FIG. 3F is reflected back to the receiving antenna 43. The receiver 43 has not yet been turned on at the time that the reflected signal shown in FIG. 3F begins so that no signal is received by the receiver 43.

The transmitter 37 is turned off at the end of 500 microseconds and the receiver 43 turned on. The receiver 43 then receives the signal reflected from the 450 kc. piezoelectric element as the signal continues during the 150 microsecond time period after the transmitter has been turned off, and the receiver 43 turned on. The signal received by receiver 43 at 450 kc. is then stored in the storage register 51.

The sweep oscillator 31 and transmitter 37 continue to be turned on and off, and the receiver 43 turned on and turned off as shown in FIG. 3 during the different frequencies. The signal repeating device 21 has piezoelectric elements 22 and 24 at 470 kc. and at 450 kc. so that signals are received by the receiver 43 at 470 and 450 kc. during the time that the receiver 43 is turned on and then stored in the storage register 51.

A new and improved system for identifying objects passing, or being passed by an interrogation device has been described. The specific improvement described herein is that the receiver is turned off during the time that the transmitter is transmitting a signal. The piezoelectric element begins its response and continues it in an exponentially damped sinusoidal which continues after the transmission of the specific signal has been completed. The transmitter is then turned off, and the receiver turned on to receive the exponentially damped sinusoidal signal.

As a result of the invention described herein, signals have been obtained at a distance of three feet with good signal-to-noise ratios. Since the transmitter and the receiver are not turned on at the same time, the transmitted power may be increased without overloading the receiver. Also by having the receiver turned on only part of the time, the input noise sensitivity is considerably reduced.

What is claimed is:

1. In an identification interrogation system comprising a signal repeating device associated with each object to be identified, each signal repeating device having a plurality of selected piezoelectric elements, each of a different preselected frequency response, and means for interrogating said signal repeating devices with a signal sweeping a frequency range covering the frequency range of said signal repeating devices for a predetermined period of time during the preselected frequency responses of each of said plurality of selected piezoelectric elements to obtain a response of frequency identified signals.

2. The invention as claimed in claim 1 wherein said means for interrogating said signal repeating devices is turned on for a first predetermined period of time during the preselected frequency responses of each of said plurality of selected piezoelectric elements to obtain a response of frequency identified signals, and means for receiving the response of frequency identified signal are turned on for a second predetermined period of time during the preselected frequency responses of each of said plurality of selected piezoelectric elements.

3. The invention as claimed in claim 2 wherein means are provided for storing the signals received by said receiving means.

4. The invention claimed in claim 2 wherein means are provided for turning on said interrogating means and turning off said receiving means during said first predetermined period of time, and for turning off said interrogating means and turning on said receiving means during said second predetermined period of time.

5. The invention as claimed in claim 1 wherein said interrogating means are turned on at the beginning of the preselected frequency response of each of said plurality of selected piezoelectric elements for a predetermined period of time and turned off before the resulting response of frequency identified signals has decayed.

6. The invention as claimed in claim 5 where means for receiving the response of frequency identified signals are turned on before the response of frequency identified signals has decayed.

7. The invention as claimed in claim 6 wherein said receiving means are turned off during the time that said interrogating means are turned on.

References Cited
UNITED STATES PATENTS

| | | | |
|---|---|---|---|
| 3,169,242 | 2/1965 | Davis et al. | 343—6.555 |
| 3,209,350 | 9/1965 | Davis et al. | 343—6.5 |

RODNEY D. BENNETT, *Primary Examiner.*

M. F. HUBLER, *Assistant Examiner.*